(12) United States Patent
Farmont

(10) Patent No.: US 7,126,806 B2
(45) Date of Patent: Oct. 24, 2006

(54) CONTROL ARRANGEMENT FOR MAINS-OPERATED APPARATUSES THAT ARE SUPPLIED WITH A LOW VOLTAGE AND PROVIDED WITH A MAINS ACTIVATION DEVICE

(75) Inventor: Rolf Farmont, Düsseldorf (DE)

(73) Assignee: Cimosys AG, Goldingen (CH)

( * ) Notice: Subject to any disclaimer, the term of this patent is extended or adjusted under 35 U.S.C. 154(b) by 297 days.

(21) Appl. No.: 10/365,751

(22) Filed: Feb. 12, 2003

(65) Prior Publication Data

US 2003/0227735 A1    Dec. 11, 2003

(30) Foreign Application Priority Data

Feb. 13, 2002   (DE) .................. 102 05 951

(51) Int. Cl.
*H01H 47/00* (2006.01)

(52) U.S. Cl. .................................... 361/160

(58) Field of Classification Search .............. 361/160; 200/16, 18, 298
See application file for complete search history.

(56) References Cited

U.S. PATENT DOCUMENTS

| | | | | |
|---|---|---|---|---|
| 3,743,807 A | * | 7/1973 | Miller et al. ............... | 200/330 |
| 4,145,589 A | * | 3/1979 | Albrechtsen ................ | 200/341 |
| 4,430,532 A | * | 2/1984 | Matsumoto ............... | 200/52 R |
| 4,757,238 A | * | 7/1988 | Rhee ............................ | 315/240 |
| 4,780,919 A | * | 11/1988 | Harrison ........................ | 5/600 |
| 5,528,449 A | | 6/1996 | Koch ........................... | 361/160 |
| 6,101,647 A | * | 8/2000 | Stroud et al. .................. | 5/618 |
| 6,385,045 B1 | * | 5/2002 | Tissington ................... | 361/704 |
| 6,601,251 B1 | * | 8/2003 | Paul ............................... | 5/611 |
| 6,614,199 B1 | * | 9/2003 | Bokamper et al. .......... | 318/445 |

FOREIGN PATENT DOCUMENTS

EP          0 615 667 B2    6/1993

* cited by examiner

*Primary Examiner*—Stephen W. Jackson
*Assistant Examiner*—Boris Benenson
(74) *Attorney, Agent, or Firm*—Fay, Sharpe, Fagan Minnich & McKee, LLP

(57) ABSTRACT

A control arrangement for apparatuses (1) with several functional actuators operated with a low voltage and supplied by a mains-operated transformer (2) provided with a mains activation device. A manually actuated switching unit (3) consolidated into a switching panel (12) and serves to control the actuators and the mains activation device by switching contacts such as pushbuttons. Transmission paths are provided to transmit control commands to the mains activation device and to the actuators. The switching unit (3) is simplified by separate switching contacts (4, 4') and (5, 5') and separate transmission paths (4A) and (5A) respectively provided in the switching unit (3) for the main activation device and for the functional actuators respectively, while the control circuits of the mains activation device and of the functional actuators are permanently separated from one another.

29 Claims, 4 Drawing Sheets

CONTROL ARRANGEMENT FOR MAINS-OPERATED APPARATUSES THAT ARE SUPPLIED WITH A LOW VOLTAGE AND PROVIDED WITH A MAINS ACTIVATION DEVICE

The invention pertains to a control arrangement, with the characteristics of claim 1, for apparatuses with several functional actuators which are operated with an electrical voltage, in particular, a low voltage and that are supplied by a mains-operated transformer that is provided with a mains activation device. This means that control arrangements of this type comprise a switching unit for controlling the functional actuators of the apparatus to be controlled and the mains activation device. This switching unit is consolidated into a manually operated switching panel, such that all functions can be controlled from this switching panel. Electrical switching contacts, which are in particular realized in the form of mechanically actuated pushbuttons, are arranged on the switching panel. In addition, transmission means are provided for transmitting the control commands from the switching unit to the mains activation device and to the functional actuators.

BACKGROUND ON THE INVENTION

Such a control arrangement is known from EP 0 615 667 B2, in which this control arrangement is described on the example of a multi-motor adjusting apparatus for a bed frame. The solution proposed in this publication makes it possible to activate the mains voltage for the mains transformer and to issue the control command for the apparatus (bed frame adjusting apparatus) with the aid of the electric pushbutton required for the respective adjusting function. The adjusting function is only carried out and the mains voltage for the mains transformer is only activated as long as the pushbutton is depressed. This means that the mains transformer is only switched on during the very short time intervals in which it is actually required. The known disadvantages of transformers that are not mains-activated, e.g., permanent current consumption, transformer humming, and emission of an electromagnetic field, can be reliably prevented. However, it is necessary to arrange an auxiliary voltage source in the control circuits of the mains activation device and of the functional actuators, which are coupled by a single pushbutton in this known control arrangement. This is necessarily realized in the form of a parallel connection between the low-voltage output of the mains transformer and the auxiliary voltage source. The mains activation device in the mains supply line of the mains transformer, which is realized separately from the switching unit, can only be activated in this way with the aid of one of the switching contacts of the switching unit that is initially voltage-free due to the mains isolation. Once this activation takes place, the switching unit is supplied with an operating voltage by the mains transformer as long as the switching contact of the switching unit is operated. During this time, the auxiliary voltage source competes with the operating voltage source (mains transformer).

Based on these circumstances, the invention aims to simplify the switching unit. It would, in particular, be desirable to eliminate the problems of competing voltage supplies of the switching unit.

SUMMARY OF THE PRESENT INVENTION

According to the invention, this objective is attained with a control arrangement with the characteristics of claim 1.

Consequently, the invention is based on the core solution of providing switching contacts that are electrically separate from one another, as well as separate transmission means for the control commands for the mains activation device on the one hand, and for the functional actuators on the other hand, in a single manually actuated switching panel, such that the switching functions for the functional actuators and for the mains activation device are preserved. Due to a permanent separation of the control circuits of the mains activation device and of the functional actuators, the respective control circuits can be operated with different electrical operating voltages that can also be optimized for the respective requirements, without relinquishing the advantage of an activation of the mains transformer exclusively for the adjusting mode.

If it is desired to operate the switching unit with one hand or one finger, an additional switching contact for the mains activation device is spatially assigned to each switching contact for a functional actuator in such a way that both switching contacts can be simultaneously actuated with only one finger. In this case, it is particularly preferred that the switching contacts for the mains activation device and for the functional actuators be successively contacted during the operation of only one switch.

A double switching contact with a contact travel transfer element has proved to be particularly advantageous for this purpose—these contacts having a simple design and being inexpensive to manufacture. The contact travel transfer element makes it possible to close switching contacts that are completely separate from one another electrically, and belong to different control circuits, with only one finger, e.g., by pressing a pushbutton. This can be realized such that simultaneous or time-offset contacting of both switching contacts takes place. Such a double switching contact in itself exhibits independent inventive merit.

However, as well understood by those skilled in the art, the control arrangement according to the invention can also be realized for two-handed manual operation in a particular simple way. This operating mode is particularly reliable and nonsusceptible to faulty operations, e.g., because an unintentional permanent operation of a switching contact does not automatically cause the desired function to be activated (for example, if a person falls asleep while holding a manual control panel that is realized in the form of a remote control, or otherwise touches the control panel while sleeping).

Furthermore, it would also be possible to couple the control panel to the apparatus to be controlled via a wireless link, e.g., in the form of an infrared remote control, rather than by a wire connection, in order to increase comfort. It would, in particular, be possible to utilize a wireless telephone that is removed from its base station in order to manually remote-control the appliance to be controlled. In this case, the switching contact for mains activation can be arranged on the base station such that mains activation is automatically initiated when the hand control, e.g., the wireless telephone is removed from the base station, and automatically turned off again when the remote control is placed back onto the base station. Such a control arrangement in itself exhibits independent inventive merit.

Although the control arrangement according to the invention essentially makes it possible to utilize directly switchable switching contacts for the respective operating voltage to be switched, it would also be possible to utilize, if so required, indirect circuits for one or the other control circuit or both control circuits, if an auxiliary switching relay is provided. These switching relays can be conventionally arranged on the apparatus to be controlled or on the mains activation device so that the structural size of the operating panel can be kept small.

The aforementioned components, as well as the claimed components to be utilized in accordance with the invention, are not subject to any special exceptions with respect to their size, shape, material selection and technical concept, so that selection criteria known in the respective field of application can be applied without limitations.

Other details, characteristics and advantages of the object of the invention are disclosed in the dependent claims and are discussed in the following description of the corresponding figures which - in a purely exemplary fashion-show preferred embodiments of a control arrangement according to the invention for mains-operated apparatuses that are supplied with a low voltage and are provided with a mains activation device. The figures show:

PREFERRED EMBODIMENT OF THE INVENTION

Figure 1:
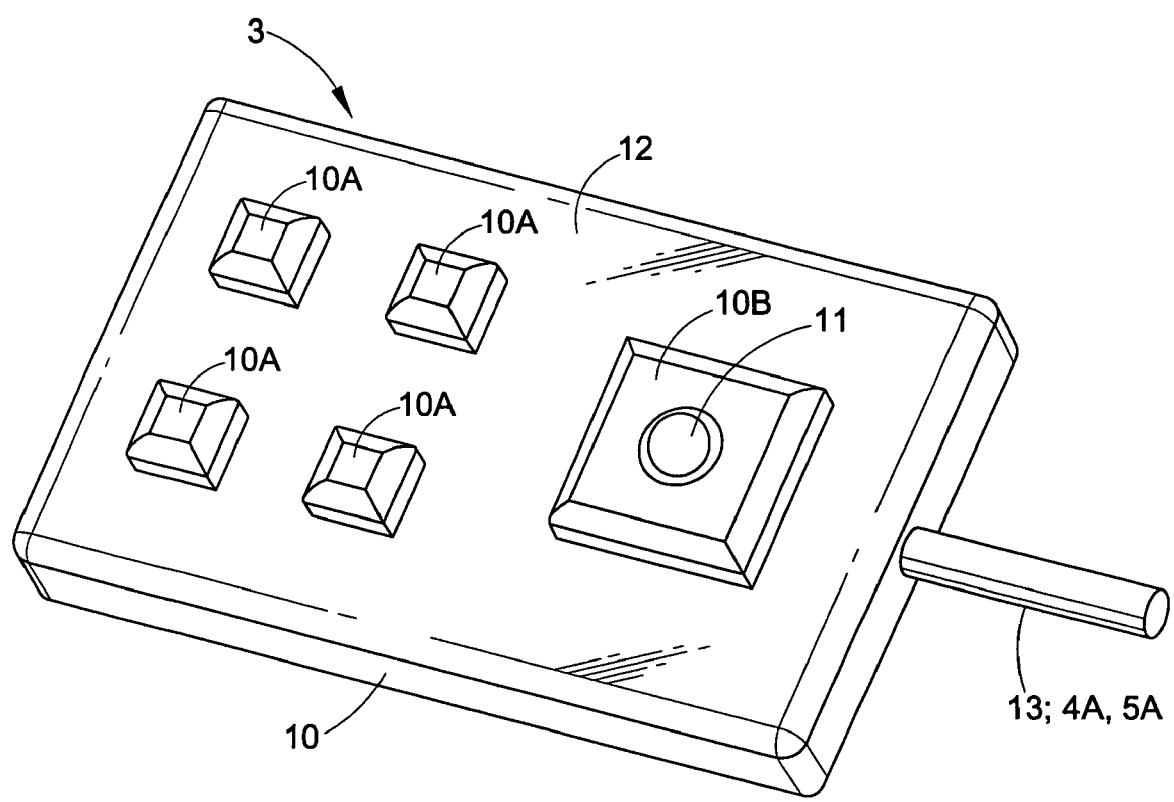
FIG. 1, a switching unit that is combined into a manually operated switching panel and has a connecting cable as the transmission means.

In the embodiment according to FIG. 1, a manually operated switching panel for a bed frame that can be adjusted by means of two motors is provided with a housing 10, wherein the switching panel 12 contains a series of pushbuttons 10A, 10B of a switching unit. The pushbuttons 10A serve for remote-control of the two adjusting motors independently in one or the other direction, and the pushbutton 10B equipped with a control lamp 11 serves to actuate the mains activation device. This embodiment is useful for two-handed manual operation.

Figure 2A:
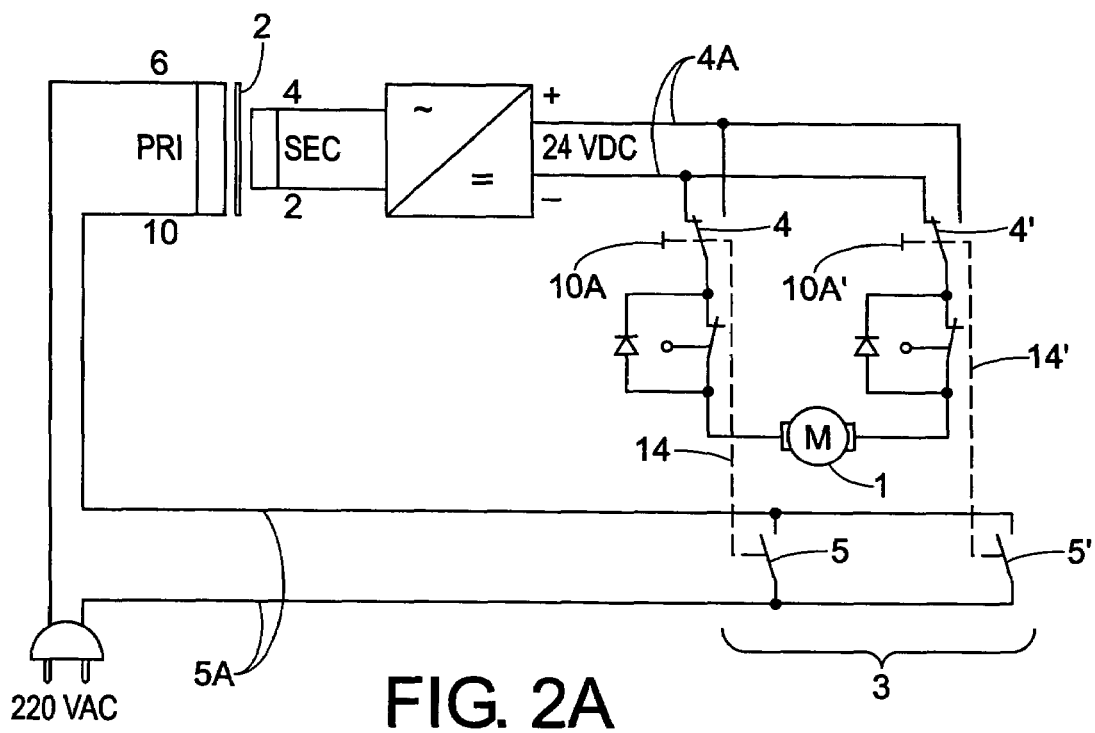
FIGS. 2A–2C, circuit diagrams for three variations of a control arrangement, and FIG. 3, a schematic diagram of a double switching contact.
Figure 2B:
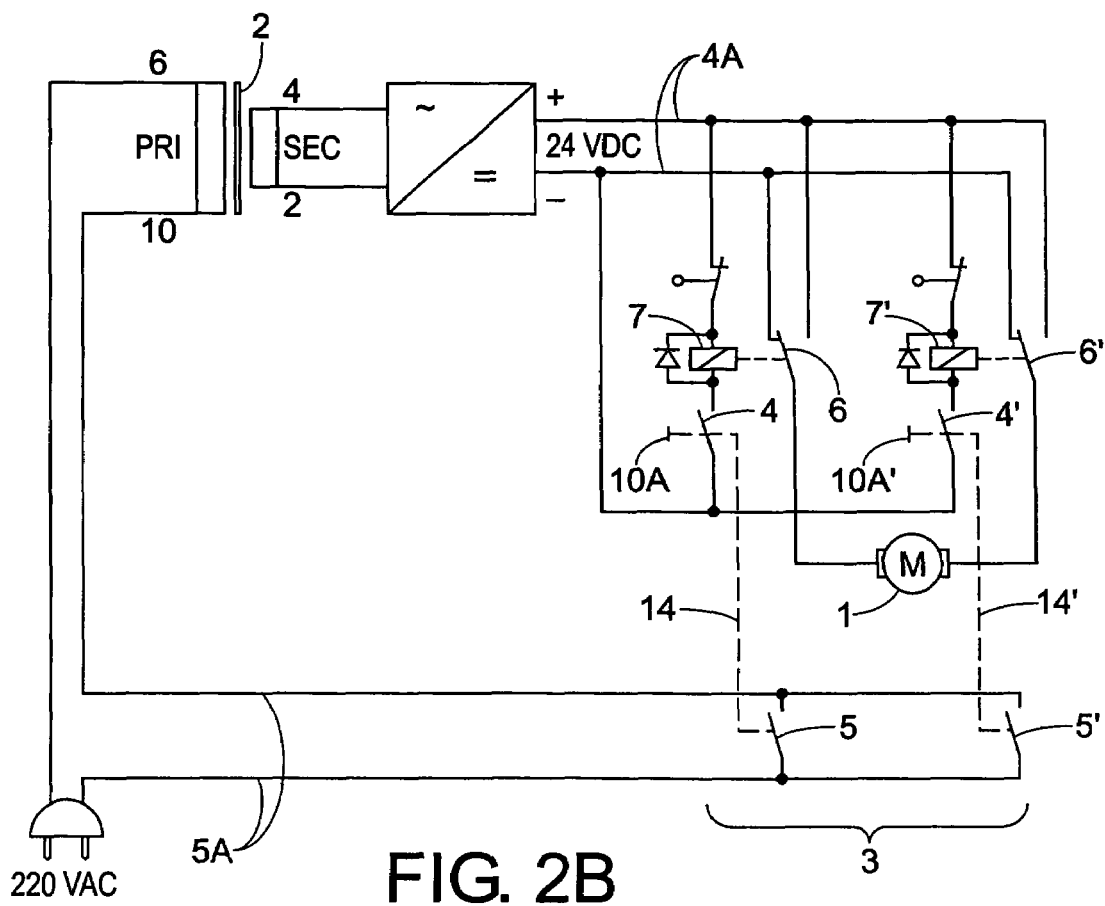
Figure 2C:
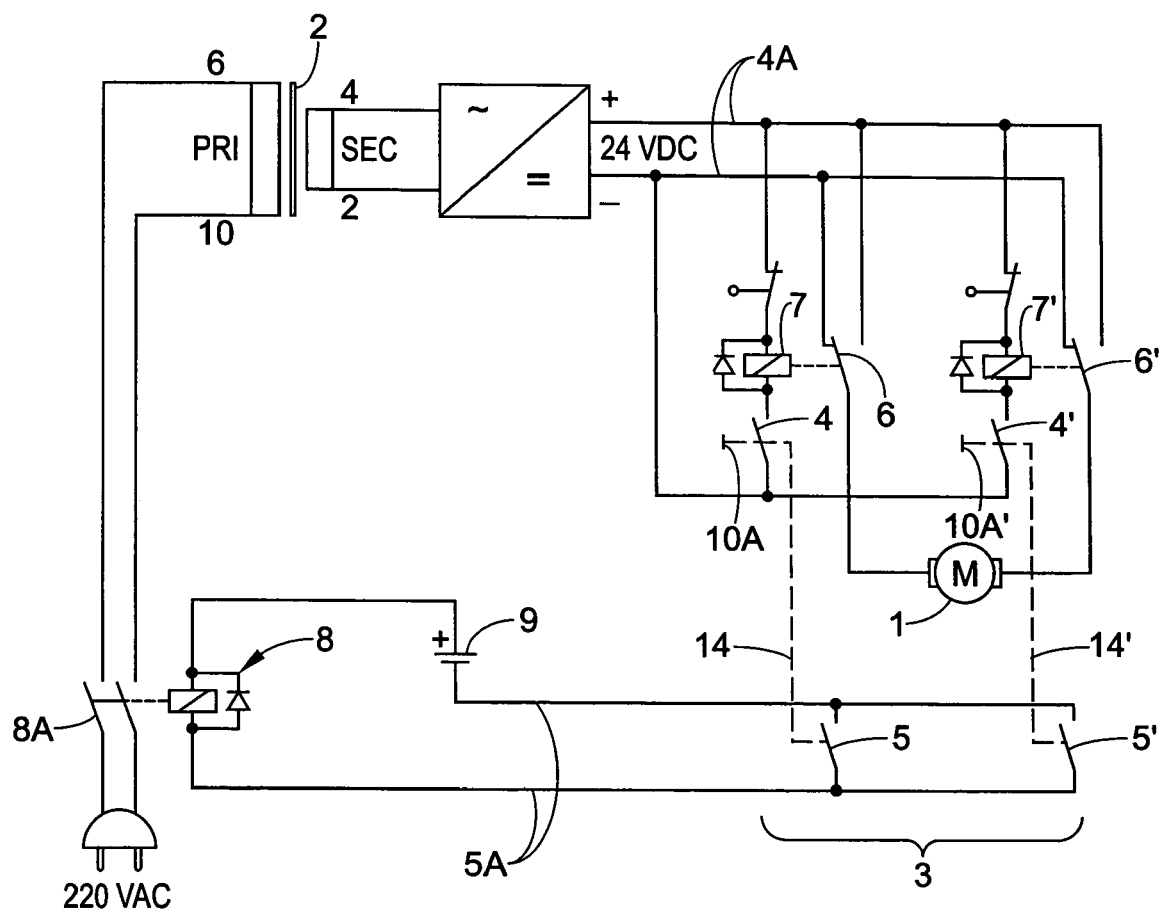

The circuit diagrams shown in FIGS. 2A–2C pertain to an embodiment that differs from that shown in FIG. 1. These circuit diagrams have the same basic structure: an apparatus 1 to be controlled, which is realized as an adjusting motor for low-voltage operation (e.g., 12 or 24 Volt), is supplied by a conventional domestic mains supply (220 V/AC) via a mains transformer 2. On the low-voltage side of the mains transformer 2, the apparatus 1 can be connected to the low-voltage output of the mains transformer by means of switching contacts 4, 4' that are realized in the form of conventional pushbutton switches, wherein the switching contact 4 is responsible for one operating direction of the apparatus and the switching contact 4' is responsible for the opposite operating direction. On the mains voltage side of the mains transformer 2, separate electrical lines 5A lead to two switching contacts 5, 5' that are permanently open in the idle state and can be jointly or selectively closed by depressing the corresponding pushbutton 10Ain order to connect the mains voltage to the mains transformer 2 when necessary. In the embodiment shown, a particularly preferred collective actuation of the respective switching contacts 4 and 5 or 4' and 5' is realized by pushbuttons 10A or 10A'. This is achieved with respective contact travel transfer element 14 and 14'. Details of such a double switching contact are illustrated in only an exemplary fashion in FIG. 3, and are described in greater detail below.

No switching relay is provided in the embodiment shown in FIG. 2A, said switching relays being illustrated for the low-voltage side in the embodiment according to FIG. 2B and identified by the reference symbols 7, 7'. These switching relays actuate switches 6, 6' for connecting to the low-voltage side of the mains transformer 2 through the apparatus 1 such that the apparatus (motor) is rotated in one or the other direction. The switches 6, 6' that serve as power switches can be arranged separately of the switching unit 3 in this case, or can be accommodated near the apparatus 1 or the mains transformer 2. This means that the switching unit 3 may comprise only the switching contacts 4, 4' and 5, 5' with two pushbuttons 10A, 10 A' and two contact travel transfer element 14, 14'.

In the embodiment according to FIG. 2C, the circuit on the low-voltage side of the mains transformer 2 is realized as in FIG. 2B. However, the mains activation portion is realized in the form of a relay circuit, wherein a two-pole relay switch 8A in the mains supply line of the mains transformer 2 is actuated by a relay 8 that in a voltage-free state holds the relay switch 8A open. The relay 8 lies in the control circuit for the mains activation device together with the switching contacts 5, 5' that are also utilized in the embodiments according to FIGS. 2A and 2B. The operating voltage for the relay 8 can be provided by a simple battery 9, for example, a 1.5 or 3 Volt battery. In this embodiment, the control circuits for the apparatus and for the mains activation are also completely separate from one another.

Figure 3:
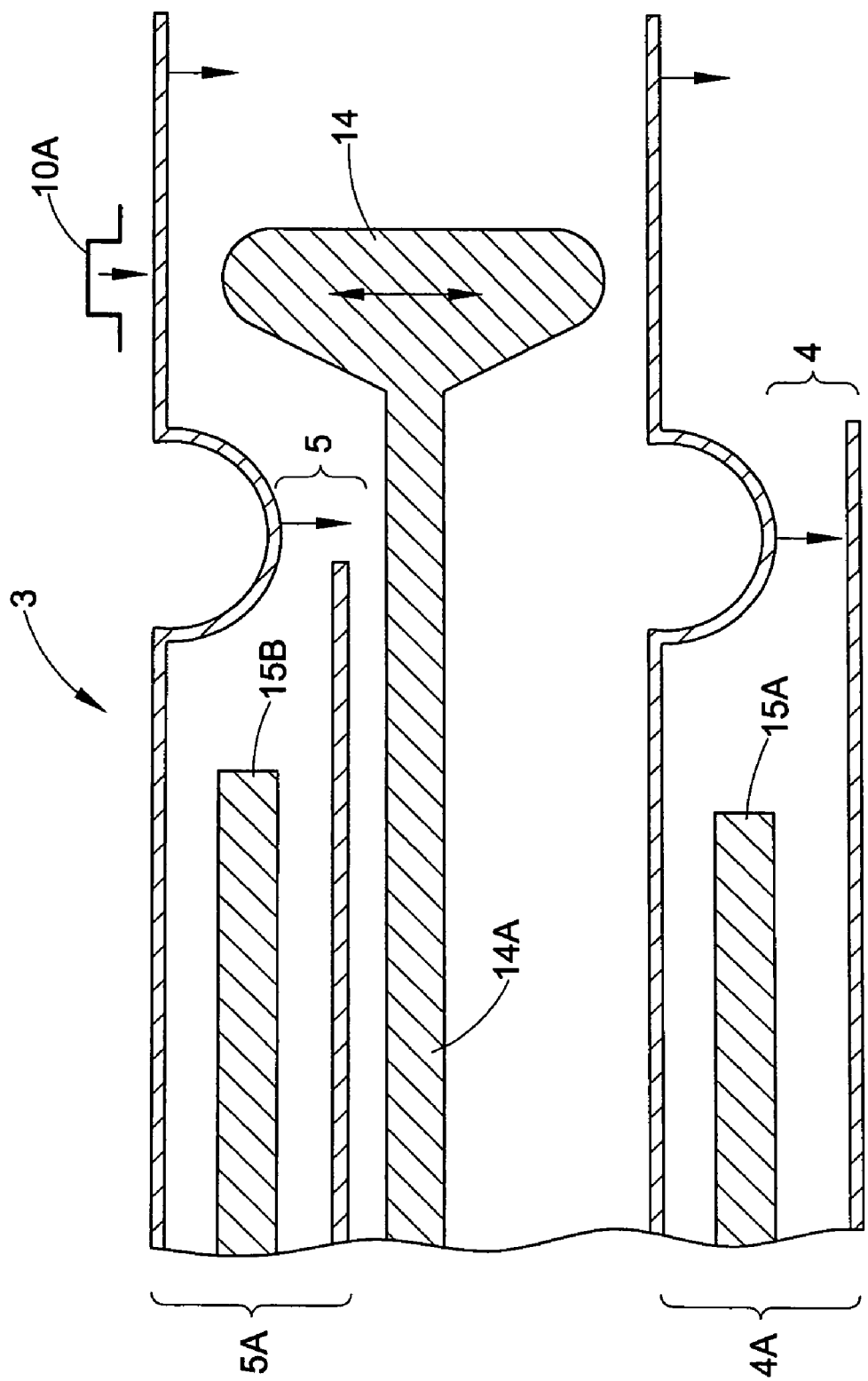

The double switching contact, illustrated in the form of a schematic section in FIG. 3, consists of a switching contact 5 for mains activation and a switching contact 4 for the functional actuator, e.g., the motor operator shown in the embodiment according to FIGS. 2A–2C. Insulators 15A and 15B separate the respective supply lines 5A and 4A leading to the switching contacts 5 and 4, the two poles of which can be realized in the form of strips of spring steel sheet. Both switching contacts can be jointly closed by a contact travel transfer element 14 when depressing a pushbutton 10A. Depending on the design of the contact travel transfer element 14, which has the shape of a hammer head and is mounted on a springy arm 14A, contacting takes place either simultaneously, or as shown successively. In this embodiment, when the pushbutton 10A is depressed, the switching contact 5 is initially closed in order to realize mains activation, and the switching contact 4 for the adjusting function is subsequently closed by means of the contact travel transfer element 14. Such a double contact switch has exceptionally small structural dimensions, and can be utilized for any adjusting function of the apparatus.

| List of reference symbols: | |
|---|---|
| 1 | Apparatus |
| 2 | Mains transformer |
| 3 | Switching unit |
| 4 | Switching contact |
| 4' | Switching contact |
| 4A | Electrical lines |
| 5 | Switching contact |
| 5' | Switching contact |
| 5A | Electrical lines |
| 6 | Switch |
| 6' | Switch |
| 7 | Low-voltage relay |
| 7' | Low-voltage relay |
| 8 | Relay |
| 8A | Relay switch |

-continued

List of reference symbols:

| | |
|---|---|
| 9 | Battery |
| 10 | Housing |
| 10A | Pushbutton |
| 10A' | Pushbutton |
| 10B | Pushbutton |
| 11 | Control lamp |
| 12 | Switching panel |
| 13 | Connecting cable |
| 14 | Contact travel transfer element |
| 14' | Contact travel transfer element |
| 14A | Arm |
| 15 | Insulator |
| 15A | Insulator |
| 15B | Insulator |

I claim:

1. Control arrangement for apparatuses (1) with several functional actuators that are operated with a low voltage, and supplied by a mains-operated transformer (2) that is provided with a mains activation device, comprising:
 a) a switching unit (3) that is consolidated into a manually operated switching panel (12) and serves to control the functional actuators and the mains activation device of the apparatus (1) to be controlled,
 b) several electrical switching contacts on the switching panel (12) that are mechanically actuated, and
 c) transmission means for transmitting control commands to the mains activation device and to the functional actuators,
 wherein the switching unit (3) comprises separate actuator switching contacts (4, 4') and mains activation device contacts (5, 5'), and
 said transmission means comprises separate actuator transmission means (4A) and mains activation device transmission means (5A) respectively provided for the functional actuators and for the mains activation device, such that the mains activation device and of the functional actuators are permanently electrically separated from one another.

2. Control arrangement according to claim 1, wherein the separate actuator switching contacts and mains activation device contacts (4, 5; 4', 5') are combined into a double switching contact adapted to be actuated by depressing a single pushbutton.

3. Control arrangement according to claim 2, wherein said switching unit further comprises a contact travel transfer element (14, 14') adapted to jointly close the actuator switching and mains activation device contacts (4,5; 4',5').

4. Control arrangement according to claim 3, wherein said contact travel transfer element is respectively arranged between the actuator switching contacts and the mains activation device contacts (4, 5; 4', 5'), and wherein the pushbutton (10A) acts upon only one of the actuator switching and mains activation device contacts.

5. Control arrangement according to claim 4, further comprising actuator relay switches (7, 7') that selectively complete a circuit of the actuator transmission means, and wherein each actuator relay switch is controlled by a control voltage that is switched together with the mains activation device contacts.

6. Control arrangement according to claim 4, wherein the mains activation device further comprises a mains-activation relay switch (8A) that selectively energizes the mains-operated transformer (2) with a mains voltage.

7. Control arrangement according to claim 3, further comprising actuator relay switches (7, 7') that selectively complete a circuit of the actuator transmission means, and wherein each actuator relay switch is controlled by a control voltage that is switched together with the mains activation device contacts.

8. Control arrangement according to claim 3, wherein the mains activation device further comprises a mains-activation relay switch (8A) that selectively energizes the mains-operated transformer (2) with a mains voltage.

9. Control arrangement according to claim 3, wherein the contact travel transfer element (14, 14') is defined with a hammer head shape and is mounted on a spring arm.

10. Control arrangement according to claim 3, wherein the contact travel transfer element (14, 14') is shaped to simultaneously close the switching contacts (4,5; 4',5').

11. Control arrangement according to claim 2, further comprising actuator relay switches (7, 7') that selectively complete a circuit of the actuator transmission means, and wherein each actuator relay switch is controlled by a control voltage that is switched together with the mains activation device contacts.

12. Control arrangement according to claim 2, wherein the mains activation device further comprises a mains-activation relay switch (8A) that selectively energizes the mains-operated transformer (2) with a mains voltage.

13. Control arrangement according to claim 1, further comprising actuator relay switches (7, 7') that selectively complete a circuit of the actuator transmission means, and wherein each actuator relay switch is controlled by a control voltage that is switched together with the mains activation device contacts.

14. Control arrangement according to claim 1, wherein the mains activation device further comprises a mains-activation relay switch (8A) that selectively energizes the mains-operated transformer (2) with a mains voltage.

15. Control arrangement according to claim 14, further comprising an auxiliary power source (9) that is used to activate the mains-activation relay switch, and wherein the auxiliary power source is recharged each time the mains transformer is switched on.

16. Control arrangement according to claim 1, wherein commands are transmitted from the switching panel to the apparatus to be controlled via a wireless link.

17. Control arrangement according to claim 1, wherein the switching panel is removed from a base station in order to remotely control the apparatus to be controlled in a wireless fashion.

18. Control arrangement according to claim 17, wherein the mains activation device is arranged on the base station in such a way that mains activation is automatically initiated when the switching panel is removed from the base station and automatically turned off again when the hand control is placed back onto the base station.

19. Control arrangement for apparatuses (1) as set forth in claim 1, wherein said electrical switching contacts on the switching panel (12) comprise respective pushbuttons.

20. Control arrangement for apparatuses (1) with several functional actuators that are operated with a low voltage and supplied by a mains-operated transformer (2) that is provided with a mains activation device, comprising:
 a) a switching unit (3) that is consolidated into a manually operated switching panel (12) and serves to control the functional actuators and the mains activation device of the apparatus (1) to be controlled,
 b) several electrical switching contacts on the switching panel (12) that are mechanically actuated, and c) transmission means for transmitting control commands to the mains activation device and to the functional actuators, wherein the switching unit (3) comprises separate actuator switching contacts (4, 4') and mains activation device contacts (5, 5'), and said transmission means comprises separate actuator transmission means (4A) and mains activation device transmission means (5A) respectively provided for the functional actuators and for the mains activation device, such that the mains activation device and of the functional actuators are permanently electrically separated from one another;

wherein the separate actuator switching contacts and mains activation device contacts (4, 5; 4', 5') are combined into a double switching contact adapted to be actuated by depressing a single pushbutton, and, wherein the combined actuator switching and mains activation device contacts are successively closed.

21. Control arrangement according to claim 20, wherein said switching unit further comprises a contact travel transfer element (14, 14') adapted to jointly close the actuator switching and mains activation device contacts (4,5; 4',5').

22. Control arrangement according to claim 20, further comprising actuator relay switches (7, 7') that selectively complete a circuit of the actuator transmission means, and wherein each actuator relay switch is controlled by a control voltage that is switched together with the mains activation device contacts.

23. Control arrangement according to claim 20, wherein the mains activation device further comprises a mains-activation relay switch (8A) that selectively energizes the mains-operated transformer (2) with a mains voltage.

24. Control arrangement for apparatuses (1) with several functional actuators that are operated with an electrical voltage, said control arrangement comprising:

a switching unit (3) that serves to control the functional actuators, wherein, in said switching unit, separate actuator switching contacts (4,4') and mains activation device contacts (5,5') and separate actuator transmission means (4A) and mains activation device transmission means (5A) are respectively provided for the functional actuators and a mains activation device, such that the functional actuators and mains activation device are permanently electrically separated from one another, wherein the separate actuator switching contacts and mains activation device contacts are combined into a double switching contact that is actuated by depressing a single pushbutton.

25. Control arrangement for apparatuses (1) with several functional actuators that are operated with an electrical voltage, said control arrangement comprising:

a switching unit (3) that serves to control the functional actuators, wherein, in said switching unit, separate actuator switching contacts (4,4') and mains activation device contacts (5,5') and separate actuator transmission means (4A) and mains activation device transmission means (5A) are respectively provided for the functional actuators and a mains activation device, such that the functional actuators and mains activation device are permanently electrically separated from one another, wherein the separate actuator switching contacts and mains activation device contacts are combined into a double switching contact that is actuated by depressing a single pushbutton, wherein the actuator switching contacts and mains activation device contacts are successively closed when said single pushbutton is depressed.

26. Control arrangement for apparatuses (1) with several functional actuators that are operated with an electrical voltage, said control arrangement comprising:

a switching unit (3) that serves to control the functional actuators, wherein, in said switching unit, separate actuator switching contacts (4,4') and mains activation device contacts (5,5') and separate actuator transmission means (4A) and mains activation device transmission means (5A) are respectively provided for the functional actuators and a mains activation device, such that the functional actuators and mains activation device are permanently electrically separated from one another, wherein the separate actuator switching contacts and mains activation device contacts are combined into a double switching contact that is actuated by depressing a single pushbutton, said control arrangement further comprising a contact travel transfer element (14, 14') adapted to jointly close the actuator switching and mains activation device contacts.

27. Control arrangement according to claim 26, wherein said contact travel transfer element is respectively arranged between the actuator switching contacts and the mains activation device contacts (4, 5; 4', 5'), and wherein the pushbutton (10A) acts upon only one of the actuator switching and mains activation device contacts.

28. Control arrangement for apparatuses (1) with at least one functional actuator that is operated with an electrical voltage and a mains activation device, said control arrangement comprising:

a) a switching unit (3) that is consolidated into a manually operated switching panel (12) and serves to control the at least one functional actuator and mains activation device of the apparatus (1) to be controlled, b) at least one electrical switching contact on the switching panel (12) that is mechanically actuated, c) transmission means for transmitting control commands to the mains activation device and to the functional actuators, wherein the manual control panel is removed from a base station in order to remotely control the apparatus to be controlled in a wireless fashion.

29. Control arrangement for apparatuses (1) with at least one functional actuator that is operated with an electrical voltage and a mains activation device, said control arrangement comprising:

a) a switching unit (3) that is consolidated into a manually operated switching panel (12) and serves to control the at least one functional actuator and mains activation device of the apparatus (1) to be controlled, b) at least one electrical switching contact on the switching panel (12) that is mechanically actuated, c) transmission means for transmitting control commands to the mains activation device and to the functional actuators, wherein the manual control panel can be removed from a base station in order to remotely control the apparatus to be controlled in a wireless fashion, wherein the mains activation device is arranged on the base station in such a way that a mains activation is automatically initiated when the hand control is removed from the base station and automatically turned off again when the hand control is placed back onto the base station.

* * * * *